US007418939B2

(12) United States Patent
Enright et al.

(10) Patent No.: US 7,418,939 B2

(45) Date of Patent: Sep. 2, 2008

(54) CRANKSHAFT ASSEMBLY WITH COATED CRANK PIN

(75) Inventors: Bernard F. Enright, Brookfield, WI (US); William K. Davis, York, SC (US); Thomas A. Lanser, Hartland, WI (US); William Lackas, Campbellsport, WI (US); Jon Janke, Cedarburg, WI (US); Jennifer M. Sampson, Pewaukee, WI (US); Tomas Smetana, Erlangen (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/777,652

(22) Filed: Jul. 13, 2007

(65) Prior Publication Data

US 2008/0011265 A1 Jan. 17, 2008

Related U.S. Application Data

(60) Provisional application No. 60/865,183, filed on Nov. 10, 2006, provisional application No. 60/830,965, filed on Jul. 14, 2006.

(51) Int. Cl.
*F02B 75/32* (2006.01)
*F16C 9/02* (2006.01)

(52) U.S. Cl. .................... 123/197.4; 384/294; 384/625

(58) Field of Classification Search .............. 123/197.4; 384/294, 625
See application file for complete search history.

(56) References Cited

U.S. PATENT DOCUMENTS

| | | | | |
|---|---|---|---|---|
| 4,577,249 | A * | 3/1986 | Cantwell | 360/99.01 |
| 5,670,265 | A | 9/1997 | Grell et al. | |
| 6,939,049 | B2 * | 9/2005 | Schubert | 384/294 |
| 2004/0126042 | A1 * | 7/2004 | Schubert | 384/429 |

FOREIGN PATENT DOCUMENTS

| | | |
|---|---|---|
| DE | 19718307 | 11/1998 |
| JP | 63019412 | 1/1988 |

* cited by examiner

*Primary Examiner*—Noah Kamen
(74) *Attorney, Agent, or Firm*—Michael Best & Friedrich LLP

(57) ABSTRACT

The invention provides a motorcycle having a frame, an engine coupled to the frame, and a crankshaft assembly. The crankshaft assembly includes a first flywheel half having an aperture, a crank pin including a first end portion, a second end portion opposite the first end portion, and a bearing surface between the first and second end portions. The first end portion is press-fit into the aperture of the first flywheel half. The first end portion, the second end portion, and the bearing surface are coated with a friction enhancer. A bearing is positioned at least partially onto the bearing surface, and a connecting rod has an aperture that at least partially receives the bearing.

23 Claims, 3 Drawing Sheets

CRANKSHAFT ASSEMBLY WITH COATED CRANK PIN

CROSS-REFERENCE TO RELATED APPLICATIONS

This application claims the benefit of U.S. Provisional Application No. 60/830,965, filed Jul. 14, 2006, and U.S. Provisional Application No. 60/865,183, filed Nov. 10, 2006. The entire contents of these provisional applications are incorporated by reference.

BACKGROUND

The present invention relates to a crankshaft assembly with a coated crank pin, and more particularly, to a crankshaft assembly with a coated crank pin used with a roller element bearing.

It is known for a motorcycle engine, and specifically a V-twin style engine, to include a crankshaft assembly including first and second flywheel halves coupled together with a single crank pin. The crank pin is connected to the flywheel halves in a variety of ways. One option is to extend threaded ends of the crank pin through holes in the opposed flywheel halves and to thread nuts onto the ends of the crank pins to secure the assembly together. Another method is to press-fit non-threaded ends of the crank pin into the holes of the opposed flywheel halves.

Sometimes, the press-fit can be strengthened by using a press-soldering process which creates a thin layer (approximately 5 μm) of solder between the press-fit components. Other methods of strengthening the press-fit connection include pressing a solid plug into a bore of the crank pin after it is press-fit into the holes of the flywheel halves, case hardening one or both of the press-fit components, or keying the press-fit.

In some assemblies, friction enhancers (e.g., platings or coatings) on the crank pin are used to enhance a press-fit connection for a crank pin on a crankshaft assembly. However, these enhancers were believed to be incompatible with roller element bearings resulting in an adverse effect on the performance of the roller element bearings. To overcome this perceived deficiency, masking of the bearing contact surface of the crank pin was introduced. However, masking is labor intensive and inefficient, and if masking is not done properly, bearing performance could be adversely impacted.

SUMMARY

In one embodiment, the invention provides a motorcycle having a frame, an engine coupled to the frame, and a crankshaft assembly. The crankshaft assembly includes a first flywheel half having an aperture, a crank pin including a first end portion, a second end portion opposite the first end portion, and a bearing surface between the first and second end portions. The first end portion is press-fit into the aperture of the first flywheel half and the second end portion is press-fit into the aperture of the second flywheel half. The first end portion, the second end portion, and the bearing surface are coated with a friction enhancer. A bearing is positioned at least partially onto the bearing surface, and a connecting rod receives the bearing.

In another embodiment the invention provides a method of manufacturing a crankshaft assembly for a motorcycle. The method includes providing a crank pin including a first end portion, a second end portion opposite the first end portion, and a bearing surface between the first and second end portions. The method further includes coating the first end portion, the second end portion, and the bearing surface with a friction enhancer. The method further includes press-fitting the first coated end portion into a corresponding aperture in a first flywheel half, positioning a bearing at least partially onto the coated bearing surface, and receiving the bearing at least partially inside an aperture of a connecting rod.

In some embodiments of the invention, the crank pin is provided with a metallic layer on substantially its entire outer surface. The metallic layer is preferably made from a zinc alloy and is simultaneously used in the area of the bearing surface as a wear resistant inner slide track for the roller body of the roller bearing. Because the metallic layer of high adhesiveness, which is produced from a zinc alloy, but also from other metals, such as copper, it is suitable not only for increasing the stability of a press-fit connection, but also as a tribological partner within a roller bearing, if the roller bodies roll over the coated bearing surface, this has no disadvantageous consequences for the service life of the roller bearing. Moreover, such metallic layers can be deposited onto the crank pins with especially high dimensional stability, so that the bearing surface satisfies the high precision requirements in terms of its cylindrical shape and its diameter for its property as an inner slide track for the roller body of the roller bearing even after the coating process. Based on this characteristic, the outer surface of the crank pin can be provided completely with the metallic layer, so that, in a time-saving and cost-saving way, the added expense for generating only local coating zones before or after the coating process can be eliminated.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
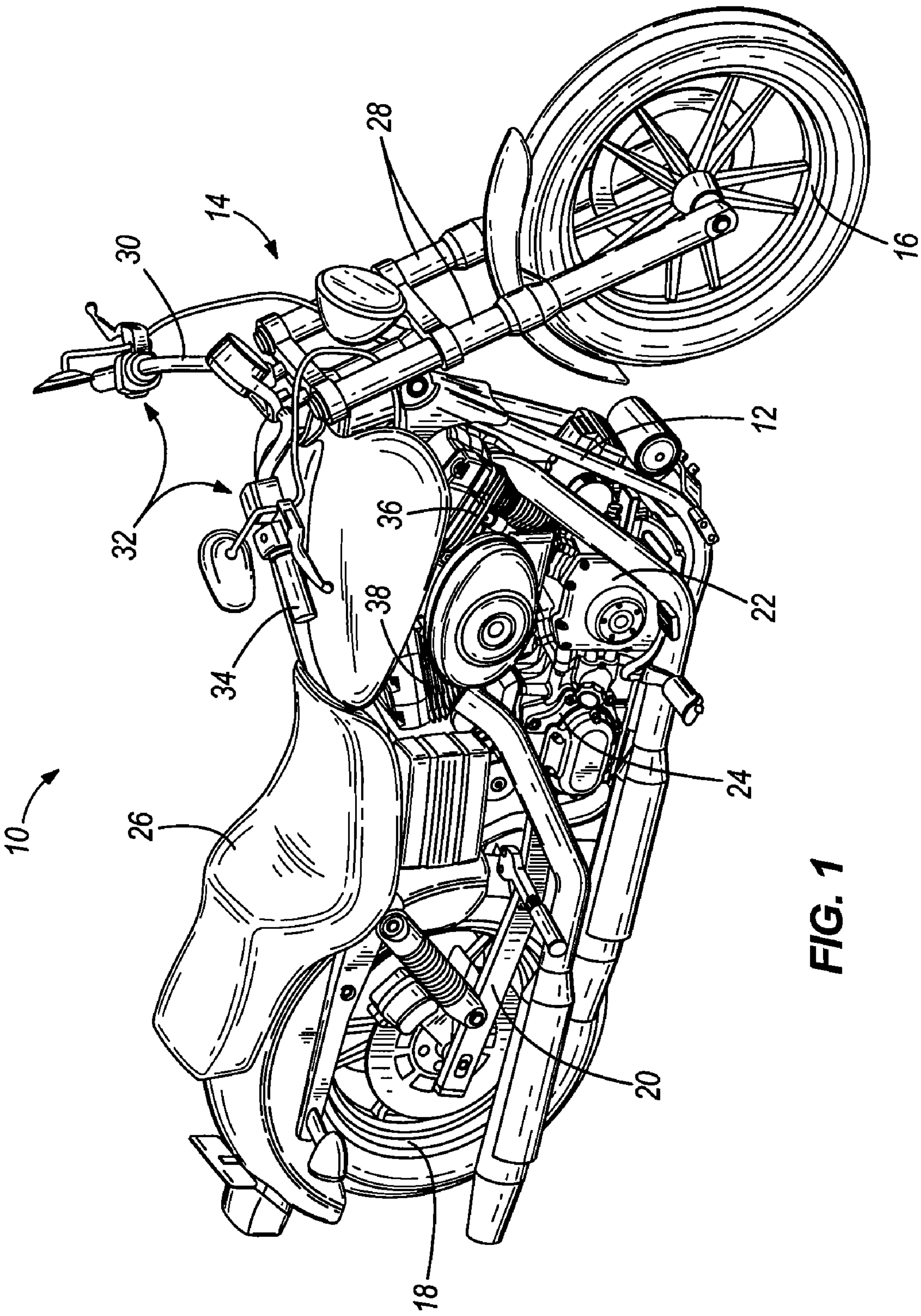
FIG. 1 is a perspective view of a motorcycle including an engine embodying to the present invention.

The motorcycle 10 of FIG. 1 includes a frame 12, a steering assembly 14 pivotably mounted to a forward portion of the frame 12, a front wheel 16 rotatably mounted to an end of the steering assembly 14, a rear wheel 18 rotatably mounted to a swing arm 20 that is pivotably connected to a rearward portion of the frame 12, and an engine 22 and transmission 24 mounted to the frame 12 and operably coupled to the rear wheel 18. A seat 26 is coupled to the frame 12 above the rear wheel 18 to support an operator. The steering assembly 14 includes a fork 28, handlebars 30, and controls 32, such as a throttle grip 34, coupled to the handlebars 30. The operator manipulates the controls 32 to power the engine 22 and transmission 24, drive the rear wheel 18, and propel the motorcycle 10. The operator maneuvers the handlebars 30 to pivot the steering assembly 14 and front wheel 16 to steer the motorcycle 10 while the motorcycle 10 is moving.

The engine 22 is an internal combustion engine including a first or front cylinder 36 and a second or rear cylinder 38. In other embodiments, the engine 22 can include more or less than two cylinders arranged in any suitable fashion such as, for example, a "V" configuration, an opposed configuration, or an inline configuration.

Figure 3:
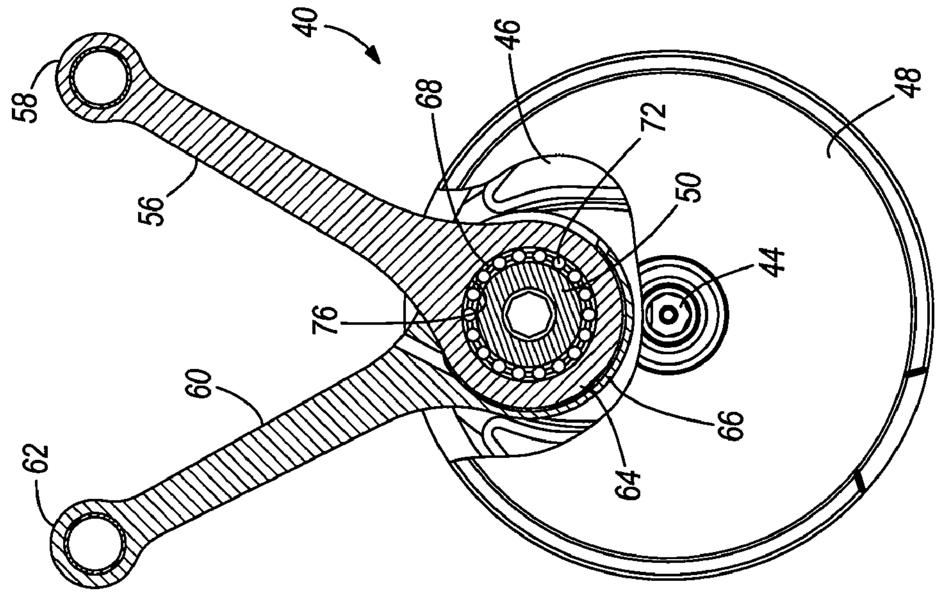
FIG. 3 is a cut-away section view taken along line 3-3 of FIG. 2.
Figure 2:
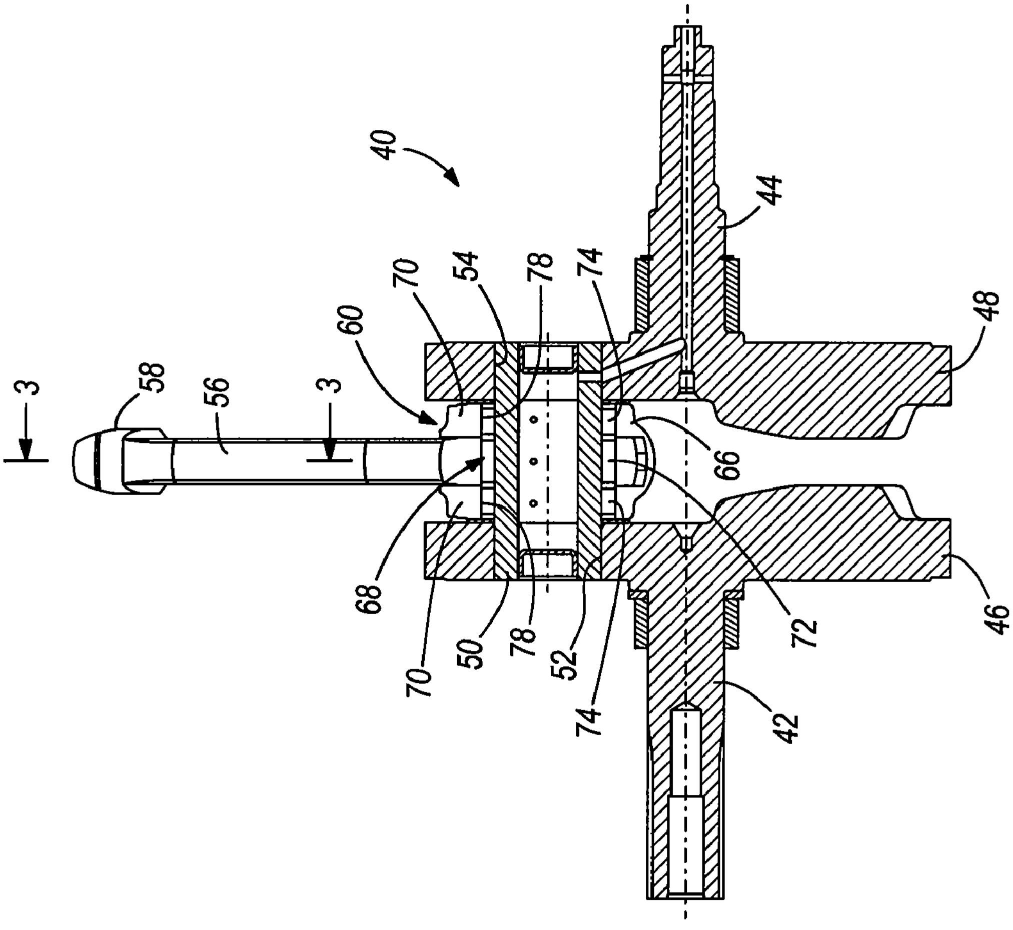
FIG. 2 is a cross-section view of a crankshaft assembly of the engine of FIG. 1.

As shown in FIGS. 2 and 3, the engine also includes a crankshaft assembly 40 having first and second crankshaft ends 42, 44 rotatably coupled to a crankcase (not shown) of the engine 22. The assembly 40 includes first and second flywheel halves 46, 48 coupled together with a single crank pin 50. The crank pin 50 is connected to each of the flywheel halves 46, 48 by press-fitting the crank pin 50 into the corresponding holes 52, 54 of the flywheel halves 46 48. The first and second flywheel halves 46, 48 are not necessarily equal in size, but are positioned generally on opposite sides of the crankpin 50. In some embodiments, only one of the first and second flywheel halves 46, 48 is included, such that the crankpin 50 is cantilevered off of the only one of the first and second flywheel halves 46, 48.

The crankshaft assembly 40 also includes a first connecting rod 56 rotatably coupled at one end 58 to a piston (not shown) reciprocally disposed within the first cylinder 36 and a second connecting rod 60 rotatably coupled at one end 62 to another piston (not shown) reciprocally disposed within the second cylinder 38. The opposite ends 64, 66 of the first and second connecting rods are rotatably connected to the crank pin 50 with a roller element bearing 68. In other embodiments, this bearing could be a caged roller bearing, a needle bearing, ball bearing, or other type of roller element bearing. The end 66 of the second connecting rod 60 is split such that the end 64 of the first connecting rod 56 can be received between the split portions 70 of the second connecting rod 60. In other embodiments, the opposite ends of the connecting rods could be similarly shaped and connected in a side-by-side relationship to the crank pin.

In the illustrated embodiment, the roller element bearing 68 is a needle bearing having center needle rollers 72 and end needle rollers 74 on opposite sides of the center needle rollers 72. A bore 76 in the end 64 of the first connecting rod 56 defines the outer race of the center needle rollers 72, and bores 78 in the split portions 70 of the second connecting rod 60 define the outer races of the end needle rollers 74.

Figure 4:
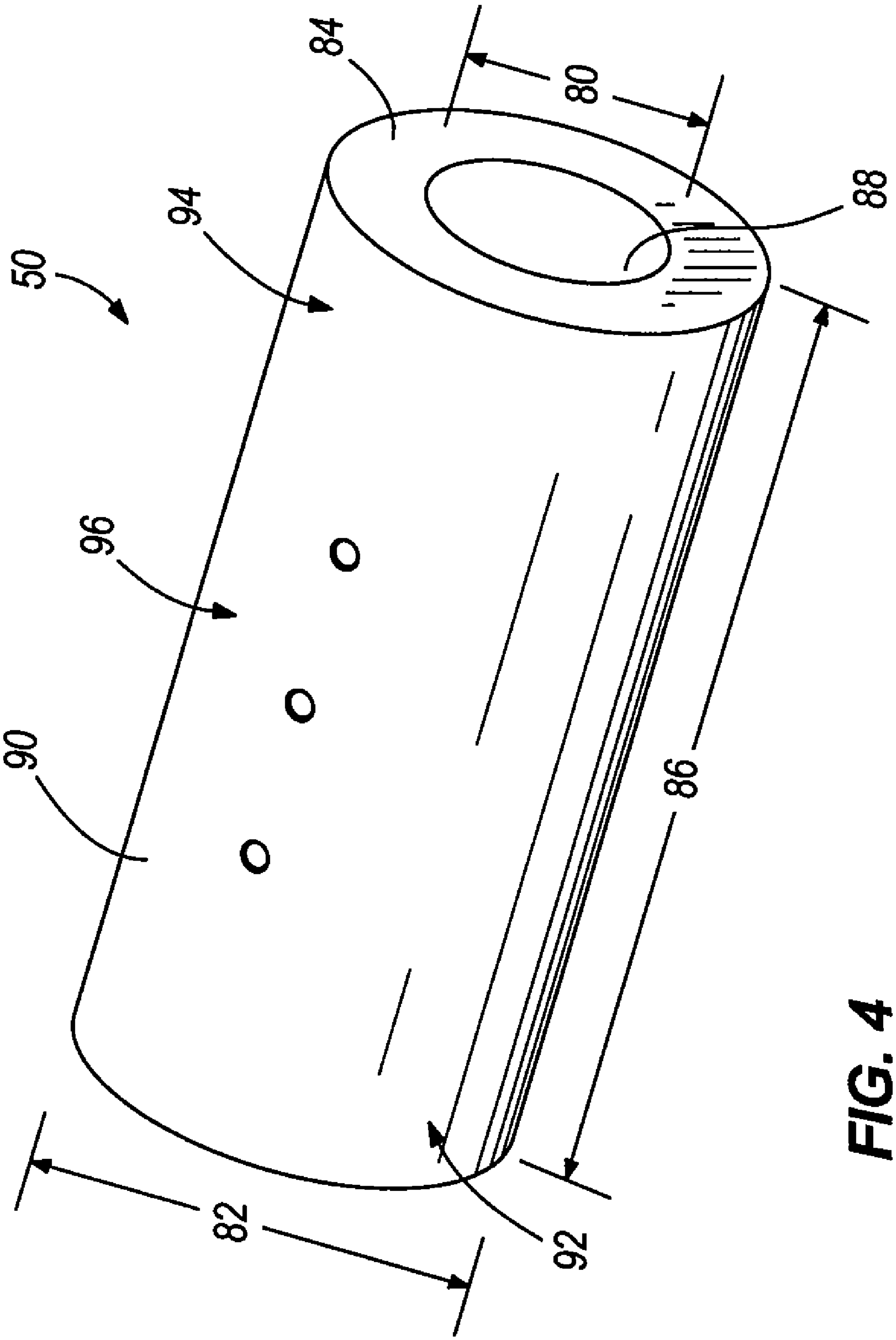
FIG. 4 is a perspective view of a crank pin of the crankshaft assembly of FIG. 2.

As shown in FIG. 4, the crank pin 50 is a cylindrical pin including an inside diameter 80, outside diameter 82, annular end faces 84, and a length 86 extending between the end faces 84. The inside diameter 80 defines an inner cylindrical surface 88 over the length 86, and the outer diameter 82 defines an outer cylindrical surface 90 over the length 86. The end faces 84 of the crank pin 50 are chamfered. The chamfer on the outside diameter is blended into the finished outside diameter 82 such that no ridges or discontinuities of any kind are visible.

The outer cylindrical surface 90 includes three zones. The first zone 92 is the area of the outer surface 90 that is positioned within the hole 52 of the first flywheel half 46 when press-fit together, and the second zone 94 is the area of the outer surface 90 that is positioned within the hole 54 of the second flywheel half 48 when press-fit together. The third zone 96 is disposed between the first and second zones 92, 94 and is the area in contact with the roller element bearing 68 when assembled together. The third zone 96 is also referred to as the bearing surface of the crank pin 50. The bearing surface 96 defines the inner race of the center and end needle rollers 72, 74 of the needle bearing 68. In the illustrated embodiment, the outer cylindrical surface 90 includes a surface roughness of about $R_a$=6 μm.

The crank pin 50 is made of bearing quality 8620 steel. The crank pin 50 is carburized, tempered, frozen to −40 degrees Fahrenheit (F.), and tempered again at 300-375 degrees F. for 1 hour at temperature.

In one embodiment, the crank pin 50 is coated all over with ZnFe 0.0005 mm-0.005 mm (per DIN 50962—Deutsches Institut fur Normung e. V.). The illustrated crank pin 50 does not undergo passivation. In other embodiments of the invention, the zinc alloy can involve a binary alloy, such as zinc/iron, zinc/cobalt, zinc/nickel. Here, the zinc/iron alloy can be, for example, approximately 99% zinc and approximately 1% iron. Alternatively, the zinc alloy can involve a ternary alloy, such as zinc/iron/cobalt, zinc/nickel/cobalt, with the zinc/iron/cobalt being made from approximately 98% to 99% zinc, approximately 0.5% to 1% iron, and approximately 0.5% to 1% cobalt. In some embodiments, the ternary alloy is combined with the binary allow. The mentioned compositions of the zinc/iron alloy and the zinc/iron/cobalt alloy, however, do not exclude process-specific and technically harmless impurities of the respective alloy due to other elements, such as phosphorus or sulfur in small amounts.

For example, suitable zinc coatings have coefficients of friction μ of approximately 0.31 to 0.37 that are favorable for the non-positive action of the press fit connections. In comparison, the coefficient of friction of an uncoated axle or hub equals approximately 0.1 to 0.15, so that in the case of a zinc coating, the load that can be transferred statically by the press-fit connection is increased by the factor 2 to 3.7.

In some embodiments, the thickness of the zinc layer equals, for example, on average, about 2.5 μm, with maximum layer thickness of about, for example, 5 μm. Such a layer thickness lies on the order of magnitude of the surface roughness of the outer surface of the crank pin, so that a change in dimension of the crank pin caused by the coating is negligible in terms of the function-specific geometrical requirements on the press surfaces and on the bearing surface.

The metallic layer of high adhesiveness is produced from a zinc alloy, or other suitable metals, such as copper, and is used for increasing the stability of a press-fit connection. Moreover, such metallic layers can be deposited onto the crank pins with especially high dimensional stability, so that the bearing surface satisfies the high precision requirements in terms of its cylindrical shape and its diameter for its property as an inner slide track for the roller body of the roller bearing even after the coating process. Based on this characteristic, the outer surface of the crank pin can be provided completely with the metallic layer. In some embodiments, only the crank pin is provided with the metallic layer, while the aligned bores of the crank arms can remain uncoated. In addition, the metallic layers can be electroplated. Other known coating methods can also be used, such as, for example, thermal sputtering, etc.

To assemble the crankshaft assembly 40, the crank pin 50 is machined, heat treated, and then coated entirely with ZnFe, or other suitable metal alloy. This coating enhances the corrosion resistance and enhances the frictional characteristics of the crank pin 50. Next, the end 64 of the first connecting rod 56 is positioned between the split portions 70 of the second connecting rod 60 to align the bores 76, 78 of the ends 64, 66. Then, with the bores 76, 78 aligned, the roller element bearing 68 is inserted into the bores 76, 78, and the crank pin 50 is press-fit into the holes 52, 54 of the flywheel halves 46, 48. In other embodiments, the crank pin can be press-fit into a single flywheel half prior to assembling the connecting rods and roller element bearing to the crank pin.

The ZnFe or suitable metallic alloy coating improves the strength of the press-fit retention. In some embodiments, the press-fit retention is increased by 25% or more. In addition, the coating does not materially negatively affect the performance of the roller element bearing contact with the crank pin 50. The roller element bearing is allowed to function normally without the need for masking during the coating operation.

Various features and advantages of the invention are set forth in the following claims.

What is claimed is:

1. A motorcycle comprising:

a frame; and an engine coupled to the frame and including a crankshaft assembly having a first flywheel half having an aperture;

a crank pin including a first end portion, a second end portion opposite the first end portion, and a bearing surface between the first and second end portions, the first end portion press-fit into the aperture of the first flywheel half, and the first end portion, the second end portion, and the bearing surface being coated with a friction enhancer;

a bearing positioned at least partially onto the bearing surface; and a connecting rod having an aperture at least partially receiving the bearing.

2. The motorcycle of claim 1, wherein the first end portion, the second end portion, and the bearing surface are coated with a zinc alloy coating.

3. The motorcycle of claim 2, wherein crank pin is completely coated.

4. The motorcycle of claim 3, wherein the thickness of the zinc alloy coating is 0.0005 mm-0.005 mm.

5. The motorcycle of claim 1, wherein the crank pin is made of bearing quality 8620 steel.

6. The motorcycle of claim 1, wherein the bearing surface includes a surface roughness of about $R_a$=6 μm.

7. The motorcycle of claim 1, wherein the bearing includes a needle bearing.

8. The motorcycle of claim 1, further comprising a second bearing positioned at least partially onto the bearing surface and a second connecting rod having an aperture at least partially receiving the second bearing.

9. The motorcycle of claim 8, wherein an end of the second connecting rod is split such that an end of the first connecting rod can be received between the split portions of the second connecting rod.

10. The motorcycle of claim 1, further comprising a second flywheel half having an aperture and the second end portion press-fit into the aperture of the second flywheel half.

11. A crankshaft assembly for an engine of a motorcycle, the crankshaft assembly comprising:

a first flywheel half having an aperture;

a crank pin including a first end portion, a second end portion opposite the first end portion, and a bearing surface between the first and second end portions, the first end portion press-fit into the aperture of the first flywheel half, and the first end portion, the second end portion, and the bearing surface being coated with a friction enhancer;

a bearing positioned at least partially onto the bearing surface; and a connecting rod having an aperture at least partially receiving the bearing.

12. The crankshaft assembly of claim 11, wherein the first end portion, the second end portion, and the bearing surface are coated with a zinc alloy coating.

13. The crankshaft assembly of claim 12, wherein crank pin is completely coated.

14. The crankshaft assembly of claim 13, wherein the thickness of the zinc alloy coating is 0.0005 mm-0.005 mm.

15. The crankshaft assembly of claim 11, wherein the crank pin is made of bearing quality 8620 steel.

16. The crankshaft assembly of claim 11, wherein the bearing surface includes a surface roughness of about $R_a$=6 μm.

17. The crankshaft assembly of claim 11, further comprising a second bearing positioned at least partially onto the bearing surface, and a second connecting rod having an aperture at least partially receiving the second bearing.

18. The crankshaft assembly of claim 17, wherein an end of the second connecting rod is split such that an end of the first connecting rod can be received between the split portions of the second connecting rod.

19. The crankshaft assembly of claim 11, wherein the bearing includes a needle bearing.

20. The crankshaft assembly of claim 11, further comprising a second flywheel half having an aperture, and the second end portion press-fit into the second flywheel half.

21. A method of manufacturing a crankshaft assembly for a motorcycle, the method including:

providing a crank pin including a first end portion, a second end portion opposite the first end portion, and a bearing surface between the first and second end portions;

coating the first end portion, the second end portion, and the bearing surface with a friction enhancer;

press-fitting the first coated end portion into a corresponding aperture in a first flywheel half;

positioning a bearing at least partially onto the coated bearing surface; and receiving the bearing at least partially inside an aperture of a connecting rod.

22. The method of claim 21, further comprising coating the first end portion, the second end portion, and the bearing surface with a zinc alloy coating.

23. The method of claim 21, further comprising press-fitting the second coated end portion into a corresponding aperture in a second flywheel half.

* * * * *